(12) United States Patent
Kimura et al.

(10) Patent No.: US 6,584,473 B2
(45) Date of Patent: *Jun. 24, 2003

(54) INFORMATION STORAGE SYSTEM

(75) Inventors: Takahisa Kimura, Odawara (JP);
Takeshi Koide, Odawara (JP); Yasushi Saitsu, Odawara (JP); Teruo Nagasawa, Odawara (JP)

(73) Assignees: Hitachi, Ltd., Tokyo (JP); Hitachi Software Engineering Co., Ltd., Yokohama (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/429,400

(22) Filed: Oct. 28, 1999

(65) Prior Publication Data

US 2003/0078903 A1 Apr. 24, 2003

(30) Foreign Application Priority Data

Oct. 29, 1998 (JP) .......................................... 10-324543

(51) Int. Cl.[7] .............................................. G06F 17/30
(52) U.S. Cl. ...................................... 707/200; 707/201
(58) Field of Search ................................ 707/200, 201, 707/202, 203, 204; 74/100; 714/6, 15

(56) References Cited

U.S. PATENT DOCUMENTS

| 5,375,232 | A | | 12/1994 | Legvold et al. |
| 5,555,371 | A | | 9/1996 | Duyanovich et al. |
| 5,742,792 | A | | 4/1998 | Yanai et al. |
| 5,758,359 | A | * | 5/1998 | Saxon ........................ 707/204 |
| 5,835,953 | A | | 11/1998 | Ohran |
| 6,324,654 | B1 | * | 11/2001 | Wahl et al. .................... 714/6 |

FOREIGN PATENT DOCUMENTS

| EP | 410630 | 1/1991 |
| EP | 838758 | 4/1998 |

* cited by examiner

Primary Examiner—Sanjiv Shah
(74) Attorney, Agent, or Firm—Antonelli, Terry, Stout & Kraus, LLP

(57) ABSTRACT

By assuring and maintaining consistency of data within a range expected by the user, significance of the consistency of data is assured. A master control unit 105 to which write data and its write time is transferred from an information processor 100 is provided with a function of obtaining the latest write time and the oldest write time of write data which has not been copied to each of remote control units 115 as a copy destination at proper timings and comparing the difference between the latest and oldest write time with a preset time on the basis of a data consistency unit such as a data set. When the difference reaches or exceeds the present time, data within the data consistency assuring range is suspended or write data and copy data is regulated.

16 Claims, 7 Drawing Sheets

INFORMATION STORAGE SYSTEM

CONFIGURATION EXAMPLE OF RAID

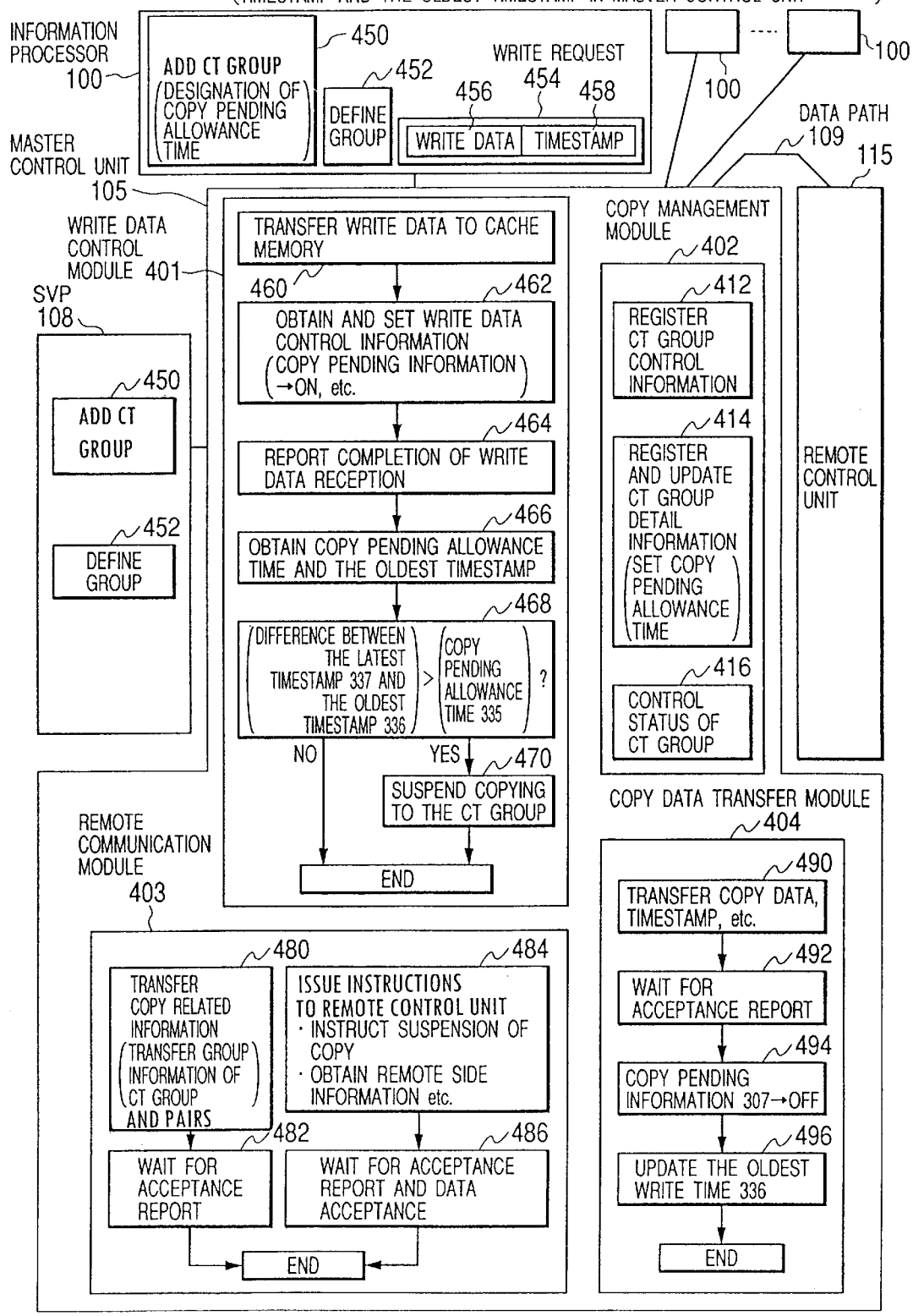
FIG. 4 — PROCESS FLOWCHART (ASSURANCE OF CONSISTENCY BY USING DIFFERENCE BETWEEN THE LATEST TIMESTAMP AND THE OLDEST TIMESTAMP IN MASTER CONTROL UNIT)

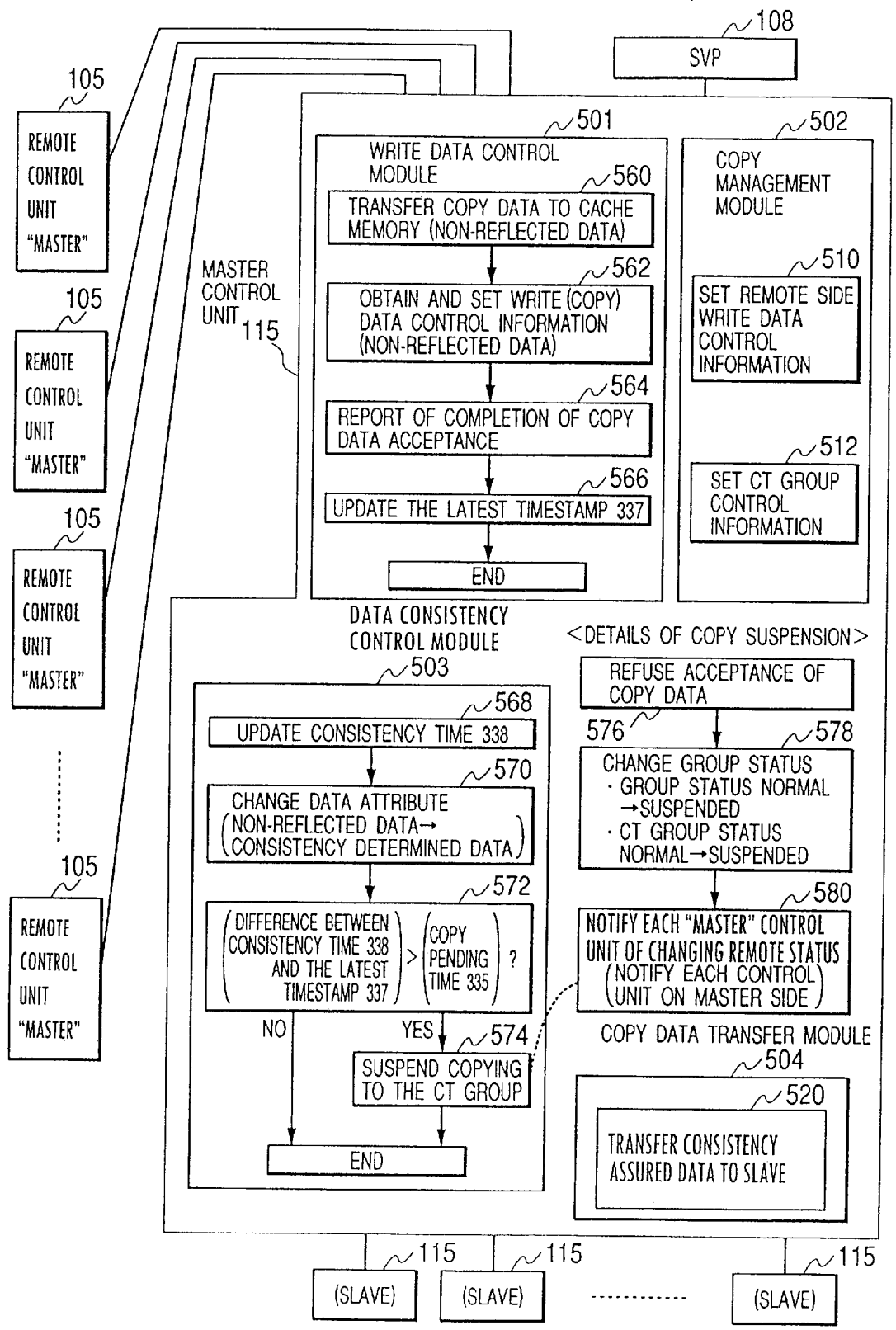
FIG. 5 PROCESS FLOWCHART (ASSURANCE OF CONSISTENCY BY USING THE LATEST TIMESTAMP ON REMOTE SIDE AND CONSISTENCY TIME)

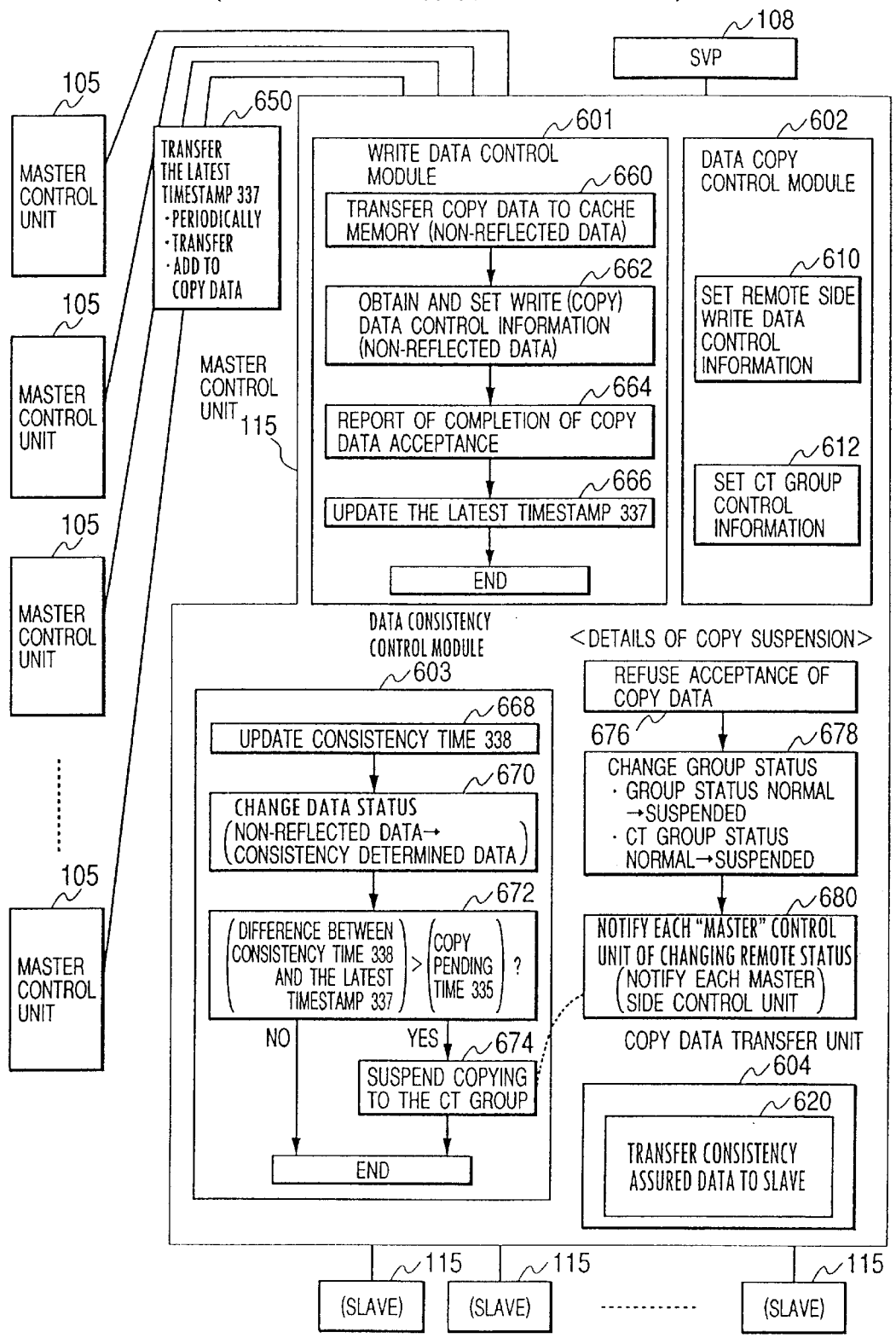
FIG. 6 PROCESS FLOWCHART (ASSURANCE OF CONSISTENCY BY USING TIMESTAMP ON MASTER SIDE AND CONSISTENCY TIME)

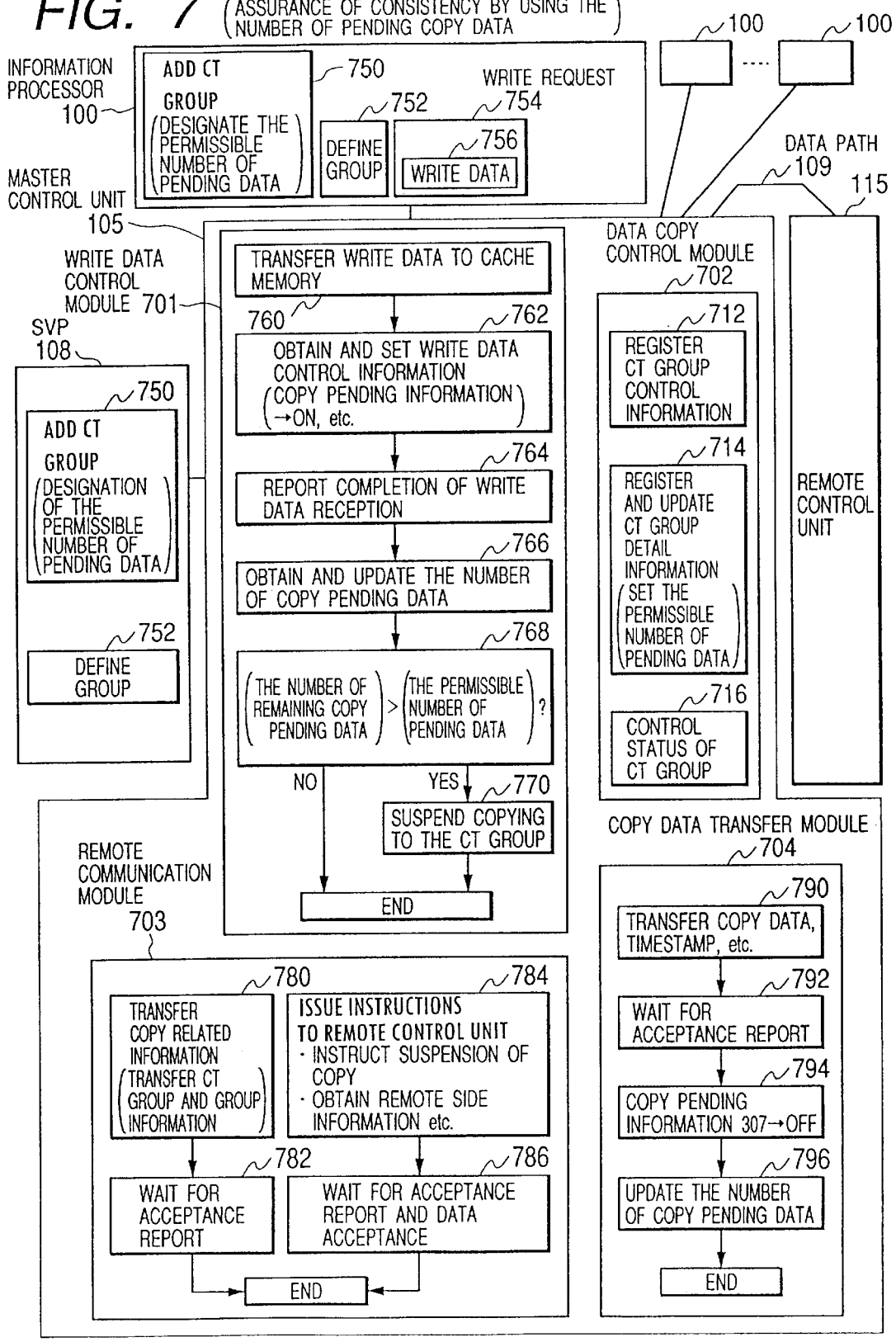
FIG. 7 PROCESS FLOWCHART (ASSURANCE OF CONSISTENCY BY USING THE NUMBER OF PENDING COPY DATA)

INFORMATION STORAGE SYSTEM

BACKGROUND OF THE INVENTION

The present invention relates to an information storage system having the function of copying or compressing and storing updated data as secondary data among one or more control units.

International application published under the patent cooperation treaty WO 94/25919 relates to duplication of data which is sent/received among control units existing in remote places and discloses an asynchronous data duplication technique which does not exert an influence on the write response by storing primary data sent from the host to a primary data control unit, after that, sending secondary data as a copy of the primary data from the primary data control unit to a secondary data control unit as a copy destination in a position which is geometrically and physically remote from the primary data control unit.

SUMMARY OF THE INVENTION

According to the International application published under the patent cooperation treaty WO 94/25919, the primary data control unit is provided with a primary data information system, the secondary data control unit is provided with a secondary data information system, and an asynchronous copying process from the primary data control unit to the secondary data control unit is performed. It is not, however, described that the primary and secondary data information systems assure consistency of data in the asynchronous data duplication.

It is therefore an object of the invention to provide a function of assuring not only consistency of data but also the limit of the assurance from various points of view, and to assure significance of the consistency of data by assuring and maintaining the data consistency within the range expected by the user.

In order to solve the problems, according to the invention, there is provided an information storage system comprising: one or more master control units each having a memory and one or more storing units, for receiving a data write request from an information processor and storing the write data; and one or more remote control units each having a memory and one or more storing units, to which the write data is transferred from the master control unit and which stores the write data, wherein any of the control units includes a control module for comparing a time difference between the latest time and the oldest time among added write time in a group of write data which has not been transferred but should be transferred to the remote control unit with a preset allowance time.

When the time difference exceeds the allowance time, the control module may regulate a write request from the information processor, or regulate or interrupt writing of data to the remote control unit as a destination of write data.

BRIEF DESCRIPTION OF THE DRAWINGS

FIG. 4 shows a processing flow in a first embodiment.

FIG. 5 shows a processing flow in a second embodiment.

FIG. 6 shows another processing flow in the second embodiment.

FIG. 7 shows a processing flow in a third embodiment.

DETAILED DESCRIPTION OF THE INVENTION

Embodiments of the invention will be described hereinbelow.

A first embodiment will be described first.

Figure 1:
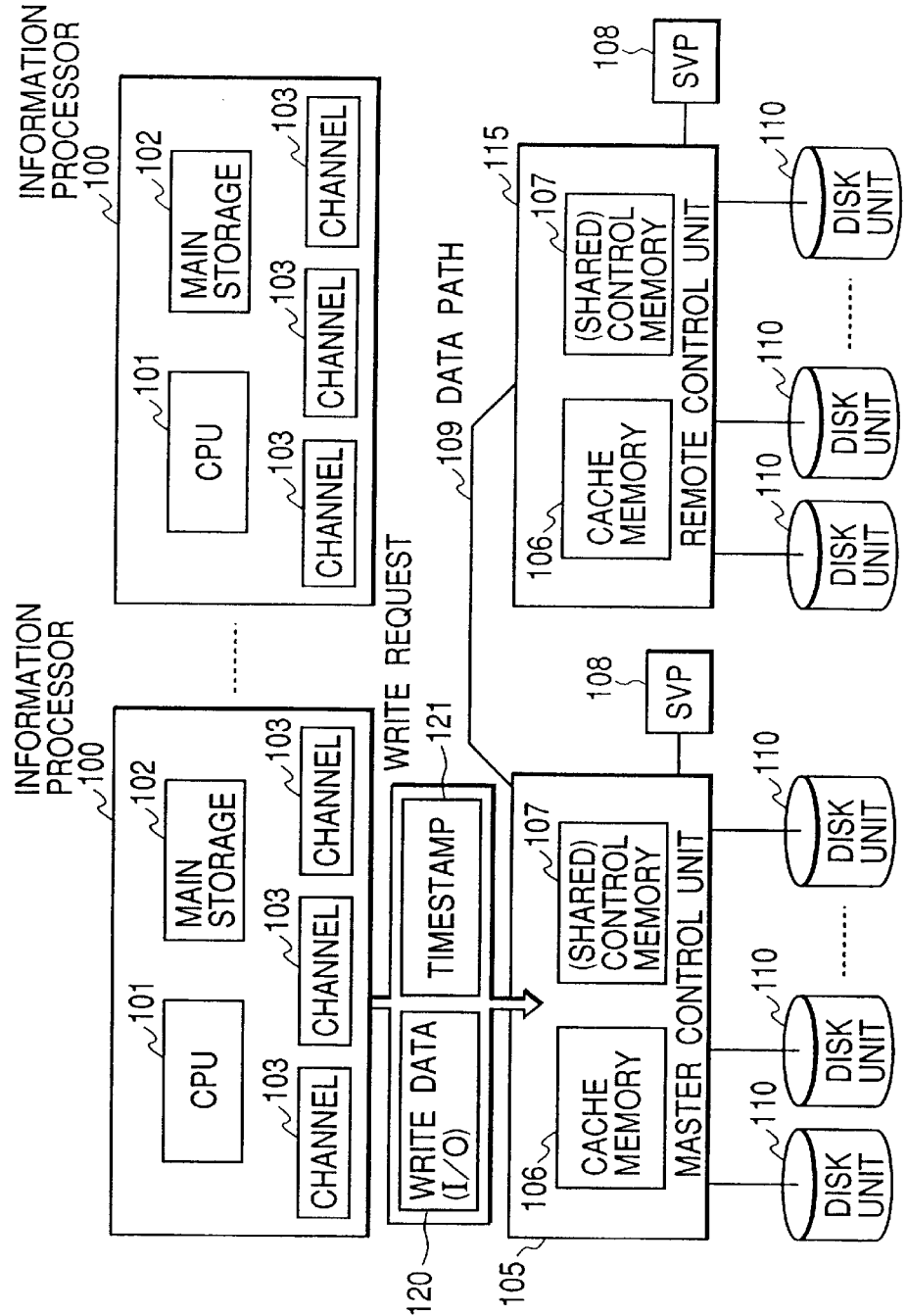
FIG. 1 shows an example of the configuration of an information storage system according to the invention.

FIG. 1 is a diagram schematically showing an information storage system according to the first embodiment. The information storage system comprises: one or more information processors 100; one master control unit 105; one or more magnetic disk units 110 serving as information storing units connected to the master control unit 105; a remote control unit 115 connected to the master control unit 105 via a data path 109; and one or more magnetic disk units 110 connected to the remote control unit 115. In the specification, the invention is not limited to the system in which the master and remote control units and the information processor are connected but can be also applied to an information system in which the master or remote control unit and the information processor are connected.

Although the processor 100 comprises a CPU 101, a main storage 102, and channels 103 in the embodiment, other configurations may be also used. For example, another apparatus (such as SVP) can have a part of the functions of the CPU and execute it.

The master control unit 105 has a cache memory 106 and a control memory 107 which can be accessed at high speed, receives a data write request from the information processor 100, and reflects data into the magnetic disk unit 110.

In order to assure high reliability, a non-volatile memory is mounted in each of the memories 106 and 107. Further, data may be duplicated in the memories 106 and 107.

The master control unit 105 sets and defines various information via the information processor. In the master control unit 105, a service processor (SVP) 108 capable of easily setting and defining the various information without using the information processor can be mounted.

Figure 2:
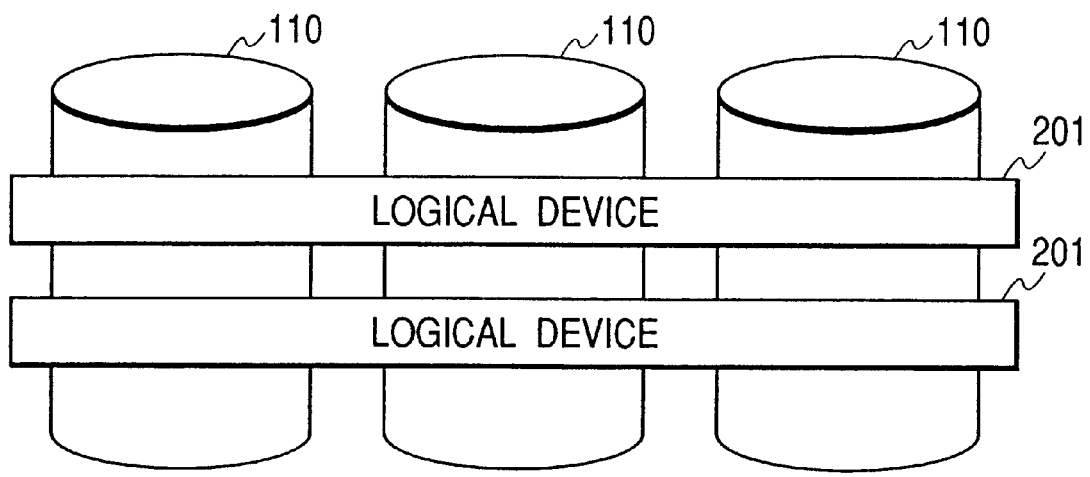
FIG. 2 is a schematic diagram of logical devices defined by a plurality of physical devices as in a RAID structure.

Further, with respect to the disk units 110, there can be a case of adopting a RAID structure for defining one or more logical disks 201 by the plurality of disk units 110 as shown in FIG. 2.

In place of the magnetic disk units 110, an information storage using other storage medium such as magnetic tape, optical disk, or semiconductor memory may be connected.

The remote control unit 115 has the configuration similar to that of the master control unit 105.

The information processor 100 sends the data write request to the master control unit 105 and transfers write data 120.

Each data write request includes its issuance time, that is, timestamp 121 and the data write request and the timestamp 121 are transferred to the master control unit 105. The timestamp may not be added to the data write request.

When a plurality of information processors 100 exist, the timestamp 121 is synchronized by using a common clock. The information processors 100 can recognize the timestamp of each other.

When the timestamp 121 is not added on the information processor 100 side, for example, the master control unit 105 side which receives the write request may add time upon receipt of the write request in place of the timestamp.

The (magnetic disk unit 110 of the) remote control unit 115 corresponds to a backup of the write data 120 which is received by the master control unit 105 from the information processor 100. The master control unit 105 transfers the write data 120 as it is as copy data or by compressing it to the remote control unit 115.

Figure 3:
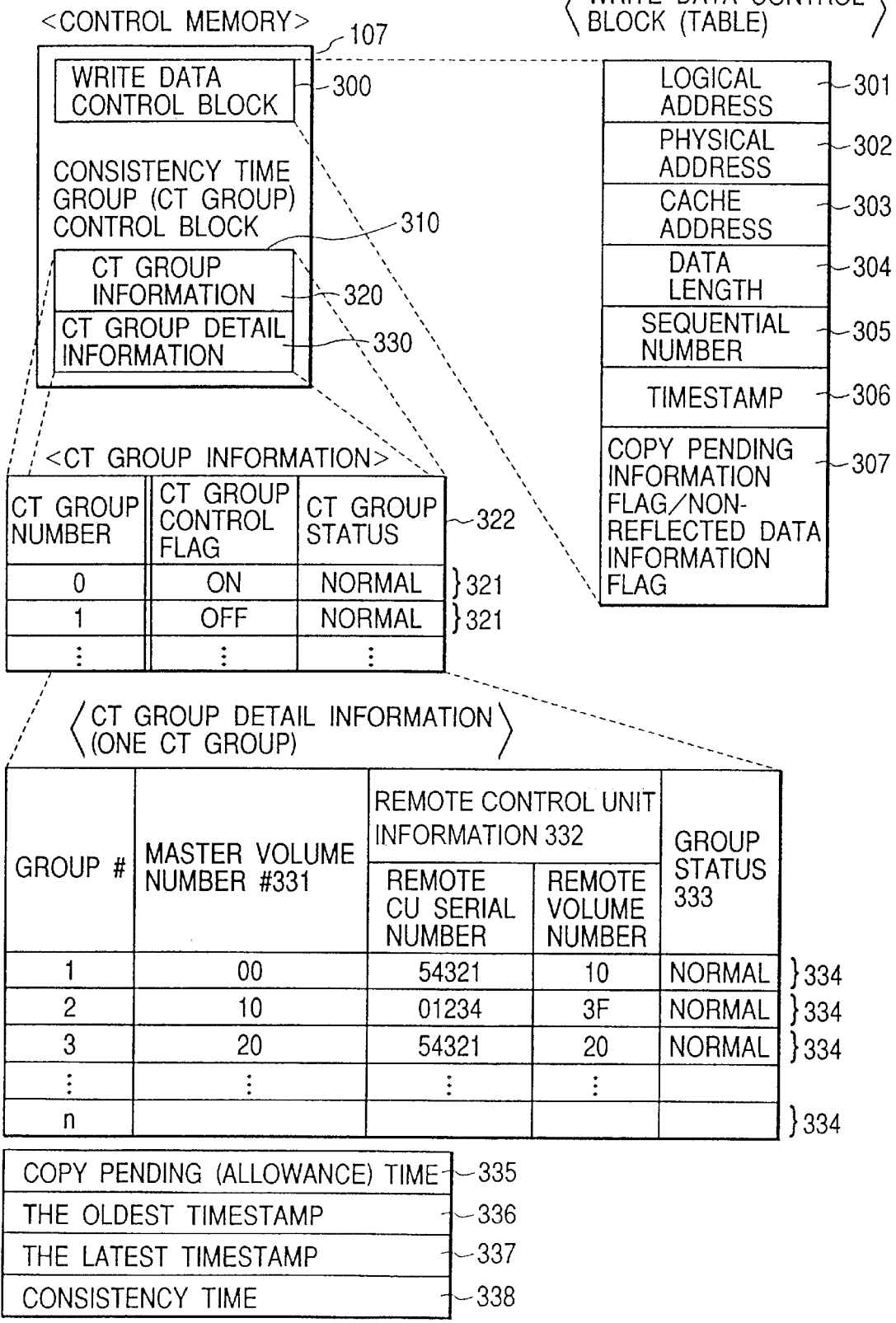
FIG. 3 is a diagram specifically showing control information written in a control memory.

FIG. 3 shows specific data in the control memory 107 in the master control unit 105.

A write data control block 300 includes a write address (logical address) 301 and a write address (physical address) 302 to the disk unit 110 to be connected to the master control unit of each data, an address 303 on the cache memory, data length 304, sequential number 305 which is serially allocated in accordance with the order of acceptance of the write request, timestamp 306, and a copy pending information flag 307 set to write data which has to be copied to the remote control unit 115, that is, which has not been transferred yet.

The copy pending information flag is included in the write data control information of the master control unit and a non-reflected data flag is included in the write data control information of the remote control unit.

A consistency time group control block 310 includes consistency time group information 320 and consistency time group detail information 330. There is/are one or more groups of write data on the copying side (master control unit 105 side) and write data on the copied side (remote control unit 115 side), for example, one or more groups of logical disks (or logical devices) 201. The consistency time group information 320 includes information indicating that one or more groups 321 (one is a unit for assuring the data consistency) is/are registered or not and the present status of each group. The consistency time group detail information 330 comprises information of each pair belonging to the group 334 (specifically, master volume number 331, remote control unit information 332 of the other side such as ID of the remote control unit and the logical device number, a group status 333 indicative of the present status of the group, and the like) and various parameters of the control group such as the oldest timestamp 336 of uncopied data belonging to the control group, the latest timestamp 337, copy pending allowance time 335 which is set and stored to suspend the copying process from a copying side to a copied side of the control group when a certain time has elapsed or to regulate data transfer from an upper apparatus to the copying side, and consistency time 338 in which the present data consistency of the control group is assured.

Data has to be copied in order from the master control unit to the remote control unit. The consistency of data denotes that the order of the data is kept. The consistency time denotes a timestamp of data which is copied last in accordance with the order and has already been copied. The data copied until the time is assured to be consistent.

In the embodiment, accurate data consistency time is held by the remote control unit 115 as a timestamp of data which is copied last in accordance with the order and has been copied. The master control unit 105 therefore obtains the latest consistency time from the remote control unit 115 and stores it into the area 338.

There is a case that information included in the control memory 107 is stored on the cache memory.

The remote control unit 115 also has a similar control memory 107. In the unit 115, the write data control block 300 is allocated for control information of each copy data in the remote control unit 115, and the consistency time group control block 310 is allocated for information regarding all of pairs for copying data to the remote control unit 115 and the group to which the pairs belong.

Particularly, in order to display copy data having timestamp later than the data consistency time (hereinlater, called non-reflected data whose consistency is not yet assured) as write data control information on the remote control 115 side, the non-reflected data display flag is provided in the embodiment. The flag may not be provided.

The non-reflected data denotes data which should not be reflected as formal data in the disk unit 110 as a target to be written.

FIG. 4 schematically shows a flow of the first embodiment.

Control group option parameters including the control group and the copy pending time 335 are set by the information processor 100 or service processor 108. The set parameters are transferred to the master control unit 105 and registered into the consistency time group control block 310 in the control memory 107 by using the function (box 412) of a copy management module 402 in the master control unit 105 (step 450).

Subsequently, a pair is defined by the information processor 100 or service processor 108, transferred to the master control unit 105, and registered into a consistency time group control block 310 in the control memory 107 by using the function (box 414) of the master control unit 105 in the copy management module 402 (step 452). In this case, the information is also reflected in the remote control unit 115 via a remote communication module 403 (step 480). The master control unit 105 waits for the response (step 482).

Subsequently, when a write request 454 is issued from the information processor 100 to each of the pairs defined, write data is received by a write data control module 401 in the master control unit 105 and stored into the cache memory 106, that is, temporarily stored (step 460).

A control area of the write data on the control memory 107 is acquired, a cache address 303, write positions 301 and 302 on logical and physical devices, write data length 304, sequential number 305, timestamp 306 to be added to the write data, and copy pending information 307 are set to "ON" (step 462), and a write completion report is sent to the information processor 100 (step 464).

Then the latest timestamp 337 of the consistency time group control block 310 on the control memory 107 is set and the difference between the latest timestamp 337 and the oldest timestamp 336 in write data whose copy pending information flag is "ON" is obtained (step 466).

The difference obtained in step 466 is compared with the copy pending allowance time 335 (step 468). When it is within the allowance time, the process of the write data control module is finished.

After that, in a certain period or at a timing when a predetermined amount of copy data is generated, a copy data transfer module 404 is called to transfer the copy data to the remote control unit 115 in accordance with the order of the sequential numbers 305 of the write requests a synchronously with the write request (step 490). A report of the copy data reception from the remote control unit 115 is waited (step 492). The copy pending information 307 with respect to the write data is set to OFF upon receipt of the reception report in step 492 (step 494). With reference to the consistency time group control block 310 in the control memory 107, the oldest timestamp 336 in the pending data is obtained and updated (step 496).

In the case where there is no pending data, when a new write request is sent to the control group, timestamp to be added to the write data is set.

On the other hand, when the difference exceeds the allowance time in step 468, in order to suspend copying of data to the control group, that is, the remote control unit 115 (step 470), the remote communication module 403 is called and a copy suspension report with respect to the control group is sent to the remote control unit 115 (step 484), and a reception report from the remote control unit 115 is waited (step 486).

Upon receipt of the receipt report of step 486, the copy management module 402 is called and the pair status 333 of each of all of the pairs 334 registered in the consistency time group control block 310 is set to be "suspended" (box 416).

In the case of suspension, the user is requested to change the setting by requesting the user to change an amount of requests from the information processor 100 to the master control unit or to change the copy pending time 335 so that the difference between the latest timestamp 337 and the oldest timestamp 336 does not exceed the copy pending time 335. After that, a copy which is consistent on both of the master and remote sides is created and an operation from the first stage as described above, that is, a normal operation is restarted. Since the recovering method after suspension is similar to the case where the copying is suspended for other reasons, its description is omitted here.

It is also possible to obtain a difference between the latest timestamp 337 and the consistency time obtained lately from the remote control unit 115 in step 484 of the remote communication module 403, that is, the consistency time 338 in the consistency time group detail information 330 of the corresponding group and to compare the difference with the copy pending allowance time.

Further, the embodiment can be applied as it is to a system comprising a plurality of master control units 105 and a plurality of remote control units 115.

A second embodiment will now be described. In the second embodiment, the copy pending allowance is determined in the remote control unit 115.

FIG. 5 schematically shows the second embodiment.

FIG. 5 is comprised of a plurality of master control units 105 and a plurality of remote control units 115.

Particularly, in the embodiment, the remote control unit 115 which controls the consistency time is called a "master" and the other control units are called "slaves". That is, all of copy data is sent from the master control unit to the "master". The "master" controls the consistency time with respect to all of the sent copy data. When the remote control unit to which the data is copied at last is a "slave", the copy data is sent to the "slave". The "slave" need not have to control the consistency time.

FIG. 5 shows a configuration example in which all of the copy data is sent to the master. A configuration of sending the copy data and its timestamp to the target remote control unit directly. And then each unit present all information to control data consistency to "master" or "master" get them from each "slave" may be also used. receives the copy data sent from the master control unit 105, the write data control module 501 stores it as non-reflected data into the cache memory 106 in the master (step 560).

Subsequently, an area of the write data control block 300 for controlling the non-reflected data is assured by the control memory 107. Addresses of the copy data in the disk units 110 are set as write addresses 301 and 302 and an address on the cache memory in which the non-reflected data is stored is set as the cache address 303.

Simultaneously, the write data length 304 is set and sequential number and write time to be transferred with the data are set in the areas 305 and 306, respectively.

The non-reflected data flag is set in the area 307 (step 562).

In the invention, it is also possible not to provide the non-reflected data flag. The non-reflected data may be collected in a specific memory area or controlled in a queue.

When the write data control block 300 for the non-reflected data is determined, the master remote control unit 115 reports the receipt to the master control unit 105 (step 564).

After that, as the latest timestamp for the non-reflected data, the timestamp of the copy data is registered as the latest timestamp 337 in the consistency time group detail information 330 on the remote side with respect to the corresponding control group (step 566).

The data consistency control module 503 properly determines the consistency time in a certain cycle and updates the area 338 (area in the remote control unit 115 which serves as the master) in the consistency time group detail information (step 568).

A non-reflected data is treated as a consistency data by, for example, resetting the non-reflected data flag to the data whose consistency has been lately assured in step 568 (step 570).

After that, a difference between the latest timestamp 337 for each control group and the latest data consistency time 338 is obtained and compared with the copy pending allowance time 335 (step 572).

The information in the area 335 is supplied in advance via the information processor 100 or service processor 108 on the master side or the information processor 100 or service processor 108 connected on the remote side.

When the difference exceeds the designated allowance time, the copying process to the control group is suspended or regulated (step 574).

Specifically, in the case of regulation, the copy data from the master side is refused or regulated (step 576). Especially, in the case of suspending the copying process, the pair belonging to the control group on the remote side and the states of the control groups (areas 333 and 322) are switched to the "suspended" status (step 578).

Simultaneously, the status change on the remote side is notified to each of the master control units 105 related to the consistency group by an interruption notification or the like (step 580).

In the embodiment, as shown in FIG. 6, the latest timestamp 337 is periodically transferred from the master control unit separately from the write data or the latest timestamp 337 on the master control side is added to the write data and transferred (box 650), thereby enabling the copy pending allowance time to be assured more strictly. Alternately, in combination with the first embodiment, the copy pending allowance time on the master side and that on the remote side are added and the sum is used as copy pending allowance time. The copy pending allowance time obtained from the latest timestamp of the latest write data written in the master control unit 105 and the consistency time can be assured more strictly.

A third embodiment will be described hereinbelow.

FIG. 7 schematically shows the third embodiment.

Since the flow of the processes of the third embodiment is basically similar to that of the first embodiment, its detailed description of the flow of processes is omitted here and only different points will be described.

In the embodiment, the timestamp is not used but the number of write requests is used as a unit. When data on a certain number of requests remains, the copying process of the control group is suspended or regulated.

Thus, the problem to be solved by the invention can be cleared without using the timestamp.

In this case, instead of the copy pending allowance time, a copy pending allowance number threshold (one data write request is calculated as once) is set in the area 335 in the consistency time group detail information 330 and the number of data which is not copied to the remote side is set instead of the oldest timestamp in the area 336.

In practice, the write data is stored in the cache memory, the write data control information is determined, and the reception is reported (steps 760, 762, 764). After that, the number of write pending data is fetched, the number of the write requests is added (step 766), and the resultant value is compared with the copy pending allowance number threshold (step 768).

When it exceeds the threshold, the copying operation to the control group is suspended or regulated.

The embodiment using the copy pending allowance number threshold can be applied almost as it is to the second embodiment using the time as a unit.

As described above, the invention can assure and maintain the consistency of data to be stored within a certain range with respect to one or more control units having the function of a synchronously copying or compressing and storing updated data as secondary data to itself or another control unit without exerting an influence on the response to the write request issued by the information processor.

A burden on data recovery can be also suppressed without loosing the significance of the consistency of data.

What is claimed is:

1. An information storage system comprising a control unit for receiving a data write request from an information processor and a storing unit connected to said control unit,
   said control unit further comprising a control module for comparing a difference between the latest write time and the oldest write time in a write data group which has been write completion reported to said information processor and has not been transferred from said information storage system to another information storage system with a preset allowance time and regulating new data write requests from said information processor when the time difference exceeds said allowance time,
   wherein the write completion reports to the information processor and the regulating new data write requests from the information processor occur a synchronously and independently of each other.

2. An information storage system according to claim 1, wherein said control module regulates a data transfer to said other information storage system when the time difference exceeds said allowance time instead of regulating the data write request.

3. An information storage system according to claim 1, wherein said control module suspends a data transfer to said other information storage system when the time difference exceeds said allowance time instead of regulating the data write request.

4. An information storage system comprising a control unit for receiving a data write request from another information storage system and a storing unit connected to said control unit,
   said control unit further comprising a control module for comparing a time difference between the latest write time among write time of the write data transferred from another information storage system and the write time of write data which has been copied at last among the transferred write data with a preset allowance time and regulating the data write request when the time difference exceeds said allowance time.

5. An information storage system according to claim 4, wherein said control module regulates a transfer from the other information storage system when the time difference exceeds said allowance time instead of regulating the data write request.

6. An information storage system according to claim 4, wherein said control module suspends a data transfer from said other information storage system when the time difference exceeds said allowance time instead of regulating the data write request.

7. An information storage system comprising a master control unit for receiving a data write request from an information processor, a storing unit connected to the master control unit, a remote control unit to which the write data is transferred from said master control unit, and a storing unit connected to said remote control unit,
   wherein said master control unit has a control module for comparing a time difference between the latest write time and the oldest write time in a group of pending write data, which has been write completion reported to said information processor, to be transferred to said remote control unit with a preset allowance time and regulating new data write requests from said information processor when the time difference exceeds said allowance time,
   wherein the write completion reports to the information processor and the regulating new data write requests from the information processor occur a synchronously and independently of each other.

8. An information storage system according to claim 7, wherein said control module regulates a data transfer to said remote control unit when the time difference exceeds said allowance time instead of regulating the data write request.

9. An information storage system according to claim 7, wherein said control module suspends a data transfer to said remote control unit when the time difference exceeds said allowance time instead of regulating the data write request.

10. An information storage system according to claim 7, wherein said master control unit has a memory for obtaining write time included in said write request as said write time.

11. An information storage system according to claim 7, wherein said master control unit has a memory for obtaining time when said information processor receives said write request as said write time.

12. A data transfer method of an information storage system comprising a master control unit for receiving a data write request from an information processor, a storing unit connected to said master control unit, a remote control unit to which the write data is transferred from said master control unit, and a storing unit connected to said remote control unit,
   wherein said master control unit compares a time difference between the latest write time and the oldest write time in a group of write data which has been write completion reported to said information processor and has not been transferred but should be transferred to said remote control unit as a destination of the write data with a preset allowance time and regulates new data write requests from said information processor when the time difference exceeds said allowance time,
   wherein the write completion reports to the information processor and the regulating new data write requests from the information processor occur a synchronously and independently of each other.

13. A data transfer method of an information storage system according to claim 12, wherein said master control unit regulates or suspend writing of data to said remote control unit as a destination of the write data transfer instead of regulating the data write request.

14. An information storage system comprising a control unit for receiving a data write request from an information processor and a storing unit connected to said control unit, said control unit further comprising a control module for comparing the number of data which has been write completion reported to said information processor and has not been copied to said other information storage system with a preset data pending allowance number and regulating new data write requests from said information processor when said number of data exceeds said data pending allowance number, wherein the write completion reports to the information processor and the regulating new data write requests from the information processor occur a synchronously and independently of each other.

15. An information storage system according to claim 14, wherein said control module regulates a data transfer to said other information storage system when said number of data exceeds said data pending allowance number instead of regulating the data write request.

16. An information storage system according to claim 14, wherein said control module suspends a data transfer to said other information storage system when said number of data exceeds said data pending allowance number instead of regulating the data write request.

* * * * *